(12) United States Patent
Qiu et al.

(10) Patent No.: US 8,606,901 B2
(45) Date of Patent: Dec. 10, 2013

(54) FACILITATING DEPLOYMENT OF NEW APPLICATION SERVICES IN A NEXT GENERATION NETWORK

(75) Inventors: Chaoxin Qiu, Austin, TX (US); Robert F. Dailey, Austin, TX (US); Richard L. Khan, San Ramon, CA (US)

(73) Assignee: AT&T Intellectual Property I, L. P., Atlanta, GA (US)

( * ) Notice: Subject to any disclaimer, the term of this patent is extended or adjusted under 35 U.S.C. 154(b) by 386 days.

(21) Appl. No.: 12/022,918

(22) Filed: Jan. 30, 2008

(65) Prior Publication Data
US 2009/0193071 A1    Jul. 30, 2009

(51) Int. Cl.
G06F 15/173    (2006.01)

(52) U.S. Cl.
USPC .......................... 709/224; 709/223; 709/227

(58) Field of Classification Search
USPC ........................................ 709/224, 223, 227
See application file for complete search history.

(56) References Cited

U.S. PATENT DOCUMENTS

| | | | |
|---|---|---|---|
| 6,910,216 B2 | 6/2005 | Abileah et al. | |
| 6,948,174 B2 | 9/2005 | Chiang et al. | |
| 7,000,016 B1 * | 2/2006 | Vanderbeck et al. | 709/226 |
| 7,184,415 B2 * | 2/2007 | Chaney et al. | 370/260 |
| 2002/0038336 A1 | 3/2002 | Abileah et al. | |
| 2003/0074578 A1 * | 4/2003 | Ford et al. | 713/200 |
| 2004/0068574 A1 | 4/2004 | Costa Requena et al. | |
| 2004/0221292 A1 | 11/2004 | Chiang et al. | |
| 2005/0165826 A1 | 7/2005 | Ho et al. | |
| 2005/0203944 A1 | 9/2005 | Dinh et al. | |
| 2005/0278447 A1 | 12/2005 | Raether et al. | |
| 2006/0040711 A1 * | 2/2006 | Whistler | 455/566 |
| 2006/0114913 A1 | 6/2006 | Cai et al. | |
| 2006/0136557 A1 | 6/2006 | Schaedler et al. | |
| 2006/0161512 A1 | 7/2006 | Schaedler et al. | |
| 2006/0165059 A1 | 7/2006 | Batni et al. | |
| 2006/0258394 A1 | 11/2006 | Dhillon et al. | |
| 2006/0291412 A1 | 12/2006 | Naqvi et al. | |
| 2006/0291437 A1 | 12/2006 | Naqvi et al. | |
| 2006/0291484 A1 | 12/2006 | Naqvi et al. | |
| 2006/0291487 A1 | 12/2006 | Naqvi et al. | |

(Continued)

OTHER PUBLICATIONS

BEA WebLogic SIP Server: The Foundation for Next-Generation Communications Services, Product Data Sheet, www.bea.com/content/news_events/white_papers/BEA_WL_SIP_Server_ds.pdf, BEA Systems, Inc.

HP OpenCall Home Subscriber Server software Data Sheet, www2.hp.com/openclal/library/products/mobility/oshss/oc_hss_%ds.pdf, Hewlett-Packard Development Company, L.P.

(Continued)

*Primary Examiner* — Mohamed Ibrahim
*Assistant Examiner* — Thomas Richardson
(74) *Attorney, Agent, or Firm* — Scott P. Zimmerman, PLLC (57) ABSTRACT

A disclosed application docking module (ADM) for use in a communication network includes a message monitor, an application monitor, and an anomaly handler. The message monitor monitors messages exchanged between a monitored application server and a session control layer resource of the network and the application monitor monitors a heartbeat of the application server. Based on the monitoring, the module determines when the application server is in an anomaly state. The anomaly state may indicate abnormal or otherwise unexpected application server messaging activity and/or an unexpected heartbeat status. The ADM processes application server messages on behalf of the application server when the application server is operating in an anomaly state. The ADM may, for example, block messages outgoing from the application server and process messages incoming to the application server by redirecting messages, returning messages to their sender, or generating an error code.

11 Claims, 8 Drawing Sheets

(56) References Cited

U.S. PATENT DOCUMENTS

| | | | |
|---|---|---|---|
| 2006/0291488 A1 | 12/2006 | Naqvi et al. | |
| 2006/0291489 A1 | 12/2006 | Naqvi et al. | |
| 2007/0008913 A1 | 1/2007 | Naqvi et al. | |
| 2007/0008951 A1 | 1/2007 | Naqvi et al. | |
| 2007/0047571 A1* | 3/2007 | Kandikonda et al. | 370/449 |
| 2007/0156413 A1 | 7/2007 | Cai et al. | |
| 2007/0174400 A1 | 7/2007 | Cai et al. | |
| 2007/0185957 A1 | 8/2007 | Mandalia et al. | |
| 2007/0206613 A1 | 9/2007 | Silver et al. | |
| 2007/0238466 A1 | 10/2007 | Buckley et al. | |
| 2007/0238467 A1 | 10/2007 | Buckley et al. | |
| 2007/0238468 A1 | 10/2007 | Buckley et al. | |
| 2007/0280256 A1* | 12/2007 | Forslow | 370/395.2 |
| 2008/0034424 A1* | 2/2008 | Overcash et al. | 726/22 |
| 2009/0089439 A1* | 4/2009 | Benco et al. | 709/228 |
| 2010/0070581 A1* | 3/2010 | Hewes et al. | 709/206 |

OTHER PUBLICATIONS

Linux on System z9 and zSeries: Integrating IMS and Linux on System z9 and zSeries for your on Demand Business, www-03.ibm.com/systems/z/os/linux/pdf/ims.pdf, International Business Machines Corporation.

Intelligent, Secure, and Open IMS-FMC Solutions, Brochure 150045-001, Sep. 2006, www.juniper.net/solutions/literature/brochures/150045, Juniper Networks.

Turner, Brough, Enabling Multimedia Ringback with IMS, Compact PCI and AdvancedTCA Systems, www.compactpci-systems.com/PDFs/NMS.Aug. 7, 2007 OpenSystems Publishing.

Architectural Choices in a Changing Market: The IMS Industry Standard, www.sonusnet.com/contents/brochures/Sonus_IMS_022006_wp.pdf, Sonus Networks, Inc.

Telcordia Converged Application Server, www.telcordia.com/collateral/brochures/application_server.pdf, Telcordia Technologies, Inc.

* cited by examiner

| ADM ID (501) | ADM URI (502) | TYPE (503) | ACTION (504) | ALTERNATE URI (505) |
|---|---|---|---|---|
| ADP#1 | Sip:app1.new_app.center1.voip.att.net | Originating | Block messages from Docked Application Server #1 | N/A |

FIG. 5A 422-2

| ADM ID (501) | ADM URI (502) | TYPE (503) | ACTION (504) | ALTERNATE URI (505) |
|---|---|---|---|---|
| ADP#2 | Sip:app2.new_app.center1.voip.att.net | Terminating | Block messages from Docked Application Server #2 | N/A |
| ADP#2 | Sip:app2.new_app.center1.voip.att.net | Terminating | Return 408 Error for Requests to Docked Application Server #2 | N/A |

| ADM ID (501) | ADM URI (502) | TYPE (503) | ACTION (504) | ALTERNATE URI (505) |
|---|---|---|---|---|
| ADP#3 | Sip:app3.new_app.center1.voip.att.net | Terminating | Block messages from Docked Application Server #3 | N/A |
| ADP#3 | Sip:app3.new_app.center1.voip.att.net | Terminating | Redirect requests for Docked Application Server #3 to Alt App Server #3 | Sip:app3.alt_app.center1.voip.att.net |

| ADM ID (501) | ADM URI (502) | TYPE (503) | ACTION (504) | ALTERNATE URI (505) |
|---|---|---|---|---|
| ADP#4 | Sip:app4.new_app.center1.voip.att.net | Proxy/B2B | Block messages from Docked Application Server #4 | N/A |
| ADP#4 | Sip:app4.new_app.center1.voip.att.net | Proxy/B2B | Return 408 Error for Requests to Docked Application Server #4 | N/A |

| ADM ID (501) | ADM URI (502) | TYPE (503) | ACTION (504) | ALTERNATE URI (505) |
|---|---|---|---|---|
| ADP#5 | Sip:app5.new_app.center1.voip.att.net | Proxy/B2B | Block messages from Docked Application Server #5 | N/A |
| ADP#5 | Sip:app5.new_app.center1.voip.att.net | Proxy/B2B | Redirect requests for Docked Application Server #5 to Alt App Server #5 | Sip:app5.alt_app.center1.voip.att.net |

| ADM ID (501) | ADM URI (502) | TYPE (503) | ACTION (504) | ALTERNATE URI (505) |
|---|---|---|---|---|
| ADP#6 | Sip:app6.new_app.center1.voip.att.net | Proxy/B2B | Block messages from Docked Application Server #6 | N/A |
| ADP#6 | Sip:app6.new_app.center1.voip.att.net | Proxy/B2B | Forward requests to Docked Application Server #6 back to session control resource | Sip:scscf.center1.voip.att.net |

FACILITATING DEPLOYMENT OF NEW APPLICATION SERVICES IN A NEXT GENERATION NETWORK

BACKGROUND

1. Field of the Disclosure

The present disclosure relates to communication networks and, more particularly, deploying new services in a communication network.

2. Description of the Related Art

In the field of communication networks, services historically have been tightly integrated to the network on which the services are offered, whether it be a plain old telephone network, a long distance network, a cellular network, an Internet protocol (IP) based network, and so forth. More recently, next generation networks (NGNs) including, as the most pervasive example, IP Multimedia Subsystem (IMS) networks have been proposed and developed, in part, to enable providers to abandon the service-per-network paradigm and to facilitate convergence of services. Many providers and equipment manufacturers are rapidly developing networks, services, and devices for IMS networks and other NGNs.

BRIEF DESCRIPTION OF THE DRAWINGS

FIG. 5A through FIG. 5F illustrate selected aspects of exemplary embodiments of anomaly handling rules suitable for use by the application docking module of FIG. 4;

DESCRIPTION OF THE EMBODIMENT(S)

In one aspect, a disclosed application docking module suitable for use in a communication network includes a message monitor and an anomaly handler. The message monitor monitors application server messages exchanged between an application server and a session control layer resource such as a session control function or a subscriber server. The application server messages may include incoming application server messages and outgoing application server messages. In the context of this disclosure, outgoing application server messages are application server messages sent from the application server to a session control layer resource and incoming application server messages are application server messages sent from a session control layer resource to an application server. Based on the monitoring, the message monitor determines or otherwise detects when the application server is operating in or exhibiting a state or condition referred to herein as an anomaly state. The anomaly state may indicate abnormal or otherwise unexpected application server message activity. The anomaly handler configures the application docking module to process application server messages on behalf of the application server when the application server is in an anomaly state.

The application docking module may include one or more message handlers connected to the anomaly handler. When activated in response to an anomaly state, a message handler may redirect, respond to, or block application server messages on behalf of the application server. The application docking module may include more than one message handler. For example, the application docking module may include a first message handler to redirect, respond to, or block a first type of application server message and a second message handler to redirect, respond to, or block a second type of application server message. The first type of application server message may include application server messages exchanged between the application server and a first type of session control layer resource such as a session control function. The second type of application server message may include application server messages exchanged between the application server and a second type of session control layer resource such as a subscriber server. In IMS embodiments of the communication network, for example, the first handler may handle application server messages to/from a Call Session Control Function (CSCF) and the second handler may handle application server messages to/from a Home Subscriber Server (HSS). The first type of application server message may be a Session Initiation Protocol (SIP) compliant message and the second type of application server message may be a Diameter protocol compliant message.

The application docking module may include an application monitor or other means to determine a heartbeat status of the application server where the heartbeat status indicates whether the application server is operable. The application monitor may determine the heartbeat status by transmitting a SIP compliant OPTIONS message to the application server and monitoring the application server's response to the message. The application docking module may be one of a plurality of application docking modules within an application docking station where each application docking module corresponds to a respective application server. Each application docking module includes a corresponding message monitor, a corresponding anomaly handler, and a corresponding set of message handlers and/or application monitors.

In another aspect, a disclosed method of deploying a service in a communication network includes providing an application server that is operable to enable the service via the network. The application server exchanges application server messages with a resource, such as a session control function or a subscriber server, in a session control layer of the network. The method includes providing an application docking module that is operable to monitor application server messages exchanged between the application server and the session control layer resource. The application docking module is capable of processing at least a portion of the application server messages on behalf of the application server. The application server may be implemented as a SIP compliant application server of an IMS network and the session control layer resource may be a session control function such as a CSCF or a subscriber server such as an HSS. The application docking module may determine from monitoring the exchanged application server messages when the application server is in an anomaly state indicative of abnormal messaging activities or events associated with the application server. The application docking module may enable or initiate an anomaly handling policy to prevent the abnormal message activity from affecting the operability of the session control layer resources or the operability of another application server of the network. The application docking module may process application server messages on behalf of the application server when the application server is in the anomaly state. In this manner, the application docking module can prevent a newly developed and installed application server from negatively affecting functionality of the network core or other application servers.

Processing application server messages on behalf of the application server may include blocking, redirecting, or responding to application server messages on behalf of the application server. Processing of the application server messages by the application docking module may be based on one or more anomaly handling rules. The anomaly handling rules may include one or more rules applicable to incoming application server messages. A rule may specify, for example, processing an incoming application server message by returning an error code, returning the message to the session control function, or redirecting the message to a preexisting application server. The application server may be implemented as an originating SIP user agent, a terminating SIP user agent, a SIP proxy server, or a SIP back-to-back user agent. Processing application server messages may be influenced at least in part by the type of the application server.

In some IMS implementations, providing the application docking module may include setting a forwarding destination for a filter criteria object associated with the application server to reflect a universal resource indicator of the application docking station, configuring an HSS to permit the application docking module to access the subscriber profile objects, configuring a Diameter message forwarder of the application docking module to forward Diameter messages between the docked application server and the HSS, and defining anomaly handling rules. Providing the application docking module may include creating a runtime instance of the application docking module when the application server is initiated.

In still another aspect, a disclosed computer program product includes computer executable instructions, stored on a tangible computer readable medium, for deploying a service in a communication network. The instructions may include instructions to monitor application server messages exchanged between a SIP compliant application server and a resource, such as a session control function or a subscriber server, in a session control layer of the communication network and determine from monitoring the messages when the application server is in an anomaly state. The instructions may further include instructions to block application server messages originated by the application server from reaching the intended session control function and instructions to process application server messages intended for the application server from a session control layer resource on behalf of the application server when the application server is in an anomaly state. The instructions may include instructions to take an anomaly handling action including, as examples, responding to the application server message with an error code message, returning the application server message to the sending session control function, and forwarding the application server message to an alternate application server. The instructions may include instructions to determine whether an anomaly criteria is met. The anomaly criteria may include, for example, a message burst criteria that is satisfied when an application server message rate exceeds a specified application server message rate threshold, an error response criteria satisfied when an error response rate exceeds an error response rate threshold, a heartbeat criteria based on a heartbeat status of the application server, and a latency criteria satisfied when a rate of message timeouts exceeds a timeout threshold. The instructions to determine the anomaly state may include instructions to determine the anomaly state based on, as an example, a comparison of a SIP message count and a Diameter message count and/or a comparison of a historical message rate to a current message rate.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Figure 1:
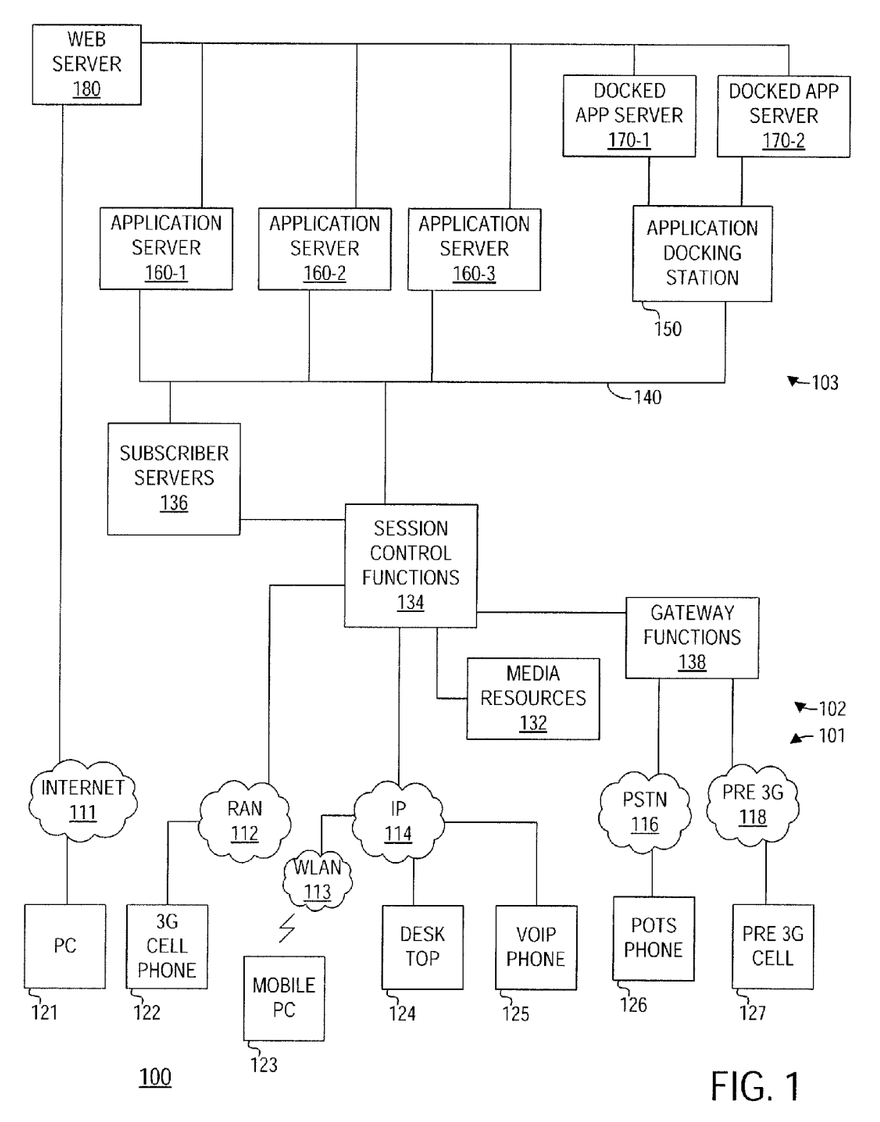
FIG. 1 is a block diagram of selected elements of an embodiment of a communication network including an application docking station.

Referring to the drawings, FIG. 1 depicts selected elements of an embodiment of an IMS network 100 including an application docking station 150 as described herein. The application docking station 150 may be used in conjunction with the introduction of a newly developed or otherwise unproven or untested application server, referred to herein as a docked application server. Although FIG. 1 depicts an IMS network, other embodiments may employ other types of NGN networks or non-NGN networks where appropriate.

FIG. 1 emphasizes the layered and access-agnostic architecture of IMS network 100. IMS network 100 as depicted supports a variety of types of user endpoint devices and a variety of types of media via which the user endpoint devices can access the network communicate with other user endpoint devices. As depicted in FIG. 1, IMS network 100 includes an access and transport layer 101, a session control layer 102 that includes session control layer resources including session control functions and subscriber servers, and an application service layer 103 that includes application servers such as application servers 160 and 170.

Access and transport layer 101 is responsible for initiating and terminating call control signaling for session setup, teardown and mid-session changes. It also provides bearer services for end-to-end communications for voice, video, and multi-media data. As depicted in FIG. 1, for example, access and control layer 101 supports a third generation (3G) compliant cellular telephone 122 that communicates via a radio access network (RAN) 112, a mobile personal computer (PC) 123 that communicates wirelessly with an IP network 114 via a wireless local area network (WLAN) 113 such as an IEEE 811 (WiFi) family WLAN, and a desktop computer 124 and a Voice over Internet (VoIP) telephone 125 that communicate with IP network 114 via wireline connections. Each of these IMS user endpoint devices 122-125 may interact directly with resources in the IMS session control layer 102 using SIP. SIP is an application-layer signaling protocol for creating, modifying, and terminating sessions with one or more participants. SIP can be used to create two-party, multiparty, or multicast sessions that include Internet telephone calls, multimedia distribution, and multimedia conferences. SIP does not mandate a particular underlying transport layer and can run over a transmission control protocol (TCP), user datagram protocol (UDP), or stream control transmission protocol (SCTP) transport layer. SIP is specified in Internet Engineering Task Force (IETF) Request for Comment (RFC) 3261.

FIG. 1 further illustrates IMS support for a legacy or POTS telephony device 126 that is connected to a circuit switched network such as the public switched telephone network (PSTN) 116 and a "pre-3G" cellular telephone 127 that is connected to a pre-3G cellular network 118. Pre-3G cellular networks include, as examples, Global System for Mobile communication (GSM) networks and CDMA networks and are designated as such in IMS networks because pre-3G user endpoint devices are not SIP compliant. Legacy telephony devices and pre-3G cellular devices access IMS session control layer resources and communicate with IMS user endpoint devices via gateway functions 138, which include Media Gateways (MGWs) that convert voice bearer streams between Time Division Multiplexing (TDM) formats and IP packet formats. Gateway functions 138 may further include Signal Gateways (SGWs), Breakout Gateway Control Functions (BGCFs), and Media Gateway Control Functions (MGCFs), all of which are known to those of ordinary skill in IMS architecture and design.

As depicted in FIG. 1, the resources in session control layer 102 include, in addition to the gateway functions 138 referred to above, session control functions 134 and subscriber servers 136. Session control functions 134 handle registration requests by IMS user endpoint devices, and process requests for call setup, teardown, and mid-session changes. Session control functions 134 may be implemented as Proxy-Call Session Control Functions (P-CSCFs), Interrogating-CSCFs (I-CSCFs), Serving-CSCFs (S-CSCFs), or a combination thereof. A P-CSCF is the first point of contact for an IMS user endpoint device. A P-CSCF has a well-known network address that can be discovered by a user endpoint device using, for example, Dynamic Host Control Protocol (DHCP). An I-CSCF is responsible for assigning an S-CSCF to an IMS user endpoint device at initial SIP registration and for routing a SIP request from another network to a responsible S-CSCF. An S-CSCF interacts with the application layer and is responsible for application invocation based on subscriber service profiles.

Session control layer 102 as shown further includes resources referred to herein as subscriber servers 136. Subscriber servers 136 may encompass a variety of functions and services including database functions for subscribers and service information as well as Diameter-based authentication, authorization, and accounting (AAA) services. In some embodiments, subscriber servers 136 may be implemented as one or more HSSs, one or more IMS-Compliant Subscriber Location Function (SLFs), or a combination thereof. An HSS is a master database for IMS subscribers. An HSS contains subscription-related information to support other network entities that actually handle calls and/or sessions. An HSS stores user identification, user inter-system location information, user security information, and service profiles. If subscriber data is stored in multiple HSSs, an SLF is queried to get the name of the HSS that stores the required data. As depicted in FIG. 1, subscriber servers 136 interface with other IMS resources including session control functions 134 and application servers 160 and docked application servers 170 using the Diameter protocol. The Diameter protocol is an authentication, authorization, and accounting protocol defined as a base protocol and one or more extensions (applications) to the base protocol. The Diameter base protocol is specified in IETF RFC 3588.

Session control layer 102 may include additional components including a BGCF, which is a part of gateway functions 138 depicted in FIG. 1. A BGCF is used when routing a call from an IMS user endpoint device to a legacy network user. The BGCF forwards a SIP request from a S-CSCF to a proper MGCF based on inter-connection agreements. The MGCF, which is also an element of gateway functions 138, uses a control protocol such as the H.248 protocol to control MGWs for providing inter-working with legacy networks. MGCFs control media channels in MGWs and perform protocol conversion between Integrated Services Digital Network (ISDN) User Part (ISUP) messages and SIP messages for calls between IMS and legacy networks.

IMS network 100 as shown further includes Media Resources 132 that provide media related services, such as conferencing, announcements, tones, collection of in-band signaling tones, and speech recognition and synthesis. Media Resources 132 may include Media Resource Function Processors (MRFPs) that reside in access and transport layer 101 and may implement media-related functions. Media Resources 132 may further include Media Resource Function Controllers (MRFCs), which are session control layer 102 resources that act as SIP User Agents to an S-CSCF and which control the MRFPs.

IMS application service layer 103 as shown includes application servers 160-1 through 160-3 that execute specific service logic to implement or support application services including subscriber services. Applications servers 160 interface with session control functions 134 using SIP protocol compliant messages. Application servers 160 can also access subscriber servers 136 using Diameter protocol compliant messages. Application servers 160, and their corresponding services, may be invoked for a subscriber by session control functions 134 in conjunction with subscriber information in subscriber servers 136.

FIG. 1 also illustrates a web server 180 accessible from a conventional personal computer (PC) 121 via the Internet 111. Web server 180 as depicted in FIG. 1 is operable to establish a connection with application servers 160 and 170 in application layer 103. In the depicted configuration, web server 180 may support remote management of the application servers. Although not depicted in FIG. 1, IMS network 100 may further include management and operational resources including fault, configuration, accounting, performance, and security (FCAPS) based element management systems and network management systems.

In some embodiments, applications servers 160 represent pre-existing, mature, or otherwise trusted or well known application servers within IMS network 100. In these embodiments, application servers 160 may communicate directly with resources in session control layer 102 including session control functions 134 and subscriber servers 136. The depicted embodiment of IMS network 100 also illustrates the presence of one or more newly developed or less than fully tested application servers, two of which are shown and identified as docked application servers 170-1 and 170-2. While it is highly desirable to implement new services and new features as quickly as possible, a malfunction in a new application server may have operational repercussions for the resources in the session control layer 102 as well as for the preexisting application servers 160. The depicted embodiment of IMS network 100 includes an application docking station 150 that is designed and operable to alleviate concerns that might otherwise arise when an unproven application is plugged into a production environment.

Figure 2:
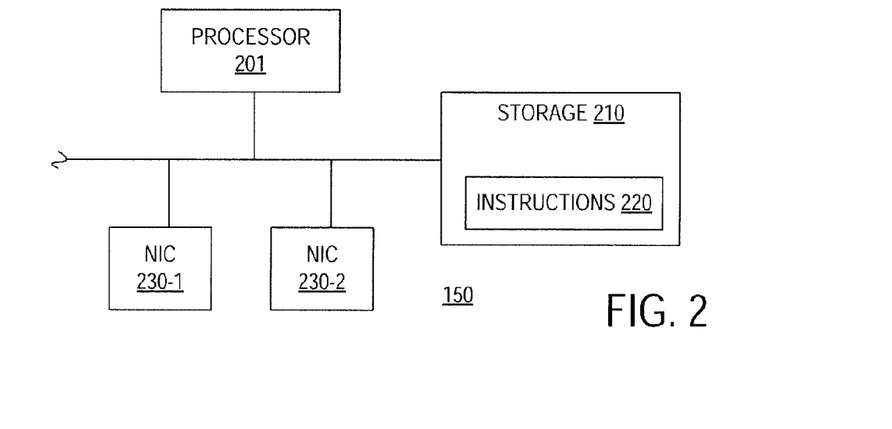
FIG. 2 is a block diagram of selected hardware elements of an embodiment of the application docking station of FIG. 1.

Application docking station 150 includes at least one application docking module that can provide, when necessary or desirable, functional isolation between a docked application server 170 and a production network including the reference point 140 that connects preexisting application servers 160 and application docking station 150 to the resources in session control layer 102. Referring to FIG. 2, selected elements of one embodiment of application docking station 150 are shown. In the depicted embodiment, application docking station 150 is implemented as a microprocessor-based data processing system that includes a general purpose, embedded, or other suitable type of microprocessor 201 that has access to a storage resource 210, which may include volatile memory elements and/or persistent storage elements. The depicted embodiment of application docking station 150 further includes multiple network interface cards (NICs) 230 including a first NIC 230-1 that communicates with first docked application server 170-1 and a second NIC 230-2 that communicates with a second docked application server 170-2. Although the depicted embodiment of application docking station 150 is shown as including two NICs 230, other embodiments may include more or fewer NICs 230.

In some embodiments, at least some elements of application docking station 150 as depicted in FIG. 2 are implemented as software and/or firmware elements. In these embodiments, application docking station 150 may include a computer program product comprising instructions 220, stored on a tangible computer readable medium such as storage resource 210. The instructions 220 may include, in some embodiments, instructions that, when executed, provide functional isolation between a new or otherwise untested application server and a production worthy interface or reference point such as the CSCF reference point 140. In other words, instructions 220 are operable to provide functional isolation between docked application server 170 and resources in session control layer 102 including session control functions 134 and subscriber servers 136.

Figure 3:
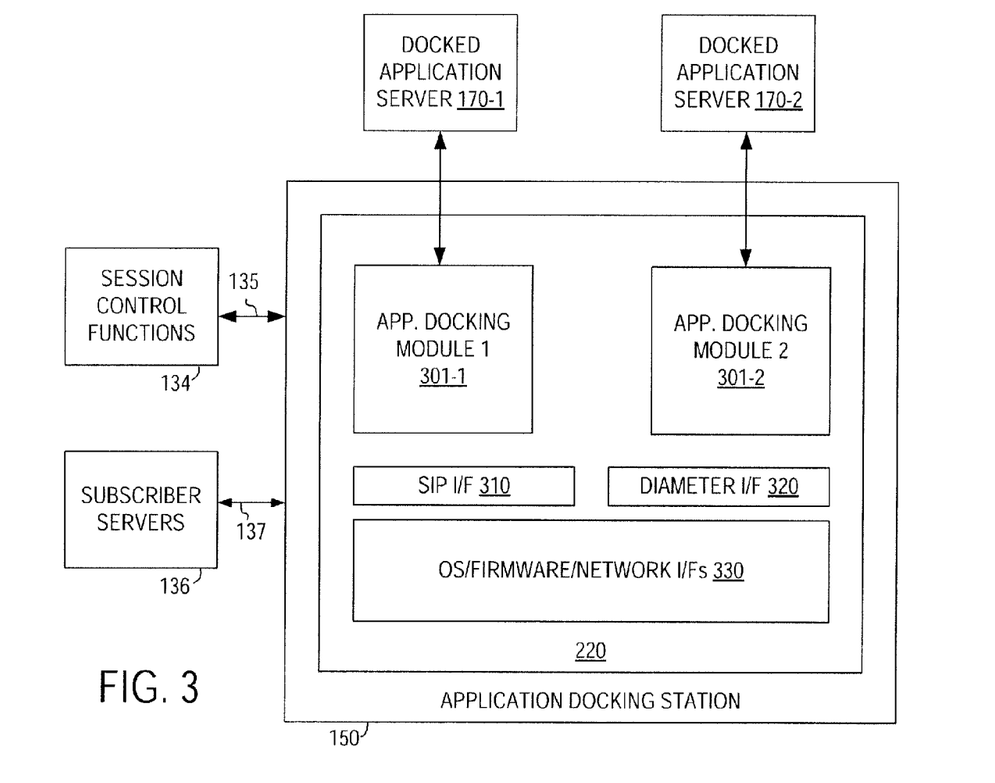
FIG. 3 is a block diagram of selected software elements, including an application docking module, of an embodiment of the application docking station of FIG. 1.

Referring to FIG. 3, selected software-based elements of application docking station 150 are depicted in block diagram form where the blocks represent groups of instructions 220 stored in storage resource 210. In the depicted embodiment, for example, application docking station 150 includes a set of two application docking modules (ADMs) 301-1 and 301-2, a first protocol interface in the form of a SIP interface 310 and a second protocol interface in the form of a Diameter interface 320. Modules 301, 310, and 320 are supported by a software infrastructure 330 that includes an operating system (OS), firmware, and suitable network interfaces.

The application docking station 150 as depicted in FIG. 3 is operable to exchange messages or otherwise communicate with session control functions 134 via a SIP compliant connection 135. Application docking station 150 is further operable to exchange messages or otherwise communicate with subscriber servers 136 via a Diameter compliant connection 137. The depicted embodiment of application docking station 150 includes multiple instances of ADMs 130. An ADM 130 is a logical entity that interacts with a corresponding docked application server 170. ADMs 130 can isolate their corresponding docked application servers 170 when desirable, for example, when a docked application server 170 is not operating properly. Thus, as depicted in FIG. 1, first ADM 301-1 corresponds to a first docked application server 170-1 and second ADM 301-2 corresponds to a second docked application server 170-2. In this embodiment, a single physical application docking station 150 encompasses multiple logical ADMs 301 and each ADM 301 corresponds to a respective docked application server 170. In some embodiments, instances of ADMs 301 are created by application docking station 150 at run time when docked application server 170 is initiated.

Figure 4:
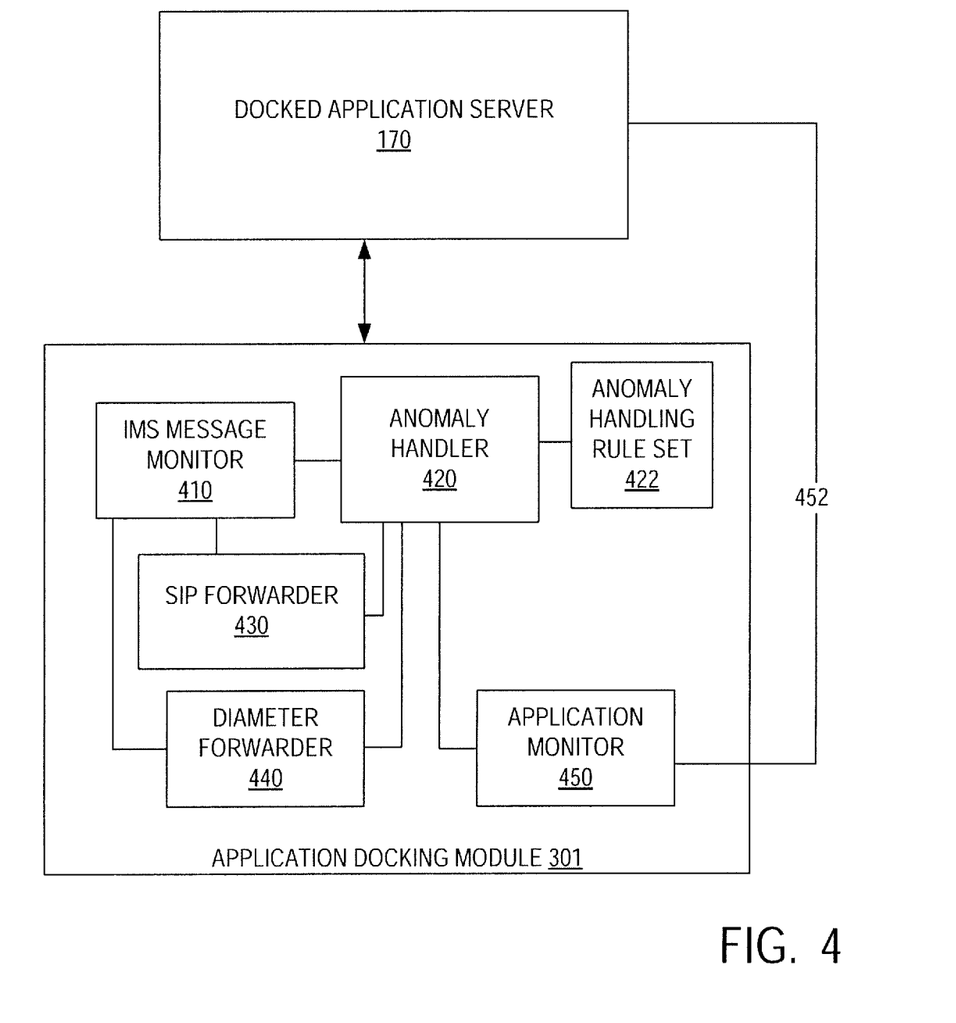
FIG. 4 is a block diagram of selected elements of an embodiment of the application docking module of FIG. 3.

Turning now to FIG. 4, a block diagram depicts selected elements of an embodiment of an ADM 301 suitable for use in application docking station 150. In the depicted embodiment, ADM 301 includes an IMS message monitor 410, an anomaly handler 420, a SIP message forwarder 430, and a Diameter message forwarder 440. In some embodiments, IMS message monitor 410 is operable to monitor messages exchanged between docked application server 170 and session control layer resources including session control functions 134 and/or subscriber servers 136. IMS message monitor 410 is enabled to determine or otherwise identify, based on the monitored messages, when docked application server 170 is in an anomaly state. IMS message monitor 410 might, for example, identify docked application server 170 as operating in or otherwise exhibiting an anomaly state when the IMS message monitor 410 detects a sudden or rapid increase or a burst in error message responses and/or a sudden or rapid increase in response timeouts. Similarly, IMS message monitor 410 may identify an anomaly state based on a rapid increase in the volume, frequency, rate, or number of new IMS messages arriving.

In some embodiments, an anomaly state indication may be triggered by any of various message monitoring criteria depending upon the implementation. For example, IMS message monitor 410 may be configured or enabled to indicate an anomaly state for docked application server 170 based on a predefined threshold of fault occurrences, based on multiple, escalating thresholds of fault occurrences, based on a disparity and/or other form of comparison between a SIP message flow and a Diameter message flow, based on a comparison with and disparity between historical message rates and current message rates, or based on a suitable form of artificial intelligence such as a neural network algorithm.

ADM 301 as depicted in FIG. 4 also includes an application monitor 450. In some embodiments, application monitor 450 is operable to determine whether docked application server 170 is in a non-operational or non-functional state. Application monitor 450 may, for example, include "heartbeat" functionality. In some embodiments, the heartbeat functionality is implemented as a procedure in which application monitor 450 transmits a request message to docked application server 170 and then determines a heartbeat status of docked application server 170 based on a response from docked application server 170. To prevent excessive heartbeat monitoring of a fully functional and normally operating docked application server 170, the heartbeat function of application monitor 450 may be invoked based on satisfaction of one or more pre-conditions. For example, the heartbeat function of application monitor 450 may be dormant unless and/or until IMS message monitor 410 detects an absence or scarcity of SIP and/or Diameter message activity between docked application server 170 and session control layer resources including session control functions 134 and/or subscriber servers 136. Other embodiments may impose other or additional prerequisites to invoking application monitor 450 to monitor the heartbeat function. Still other embodiments may impose fewer, more lenient, or no restrictions to invoking application monitor 450 to transmit and monitor the heartbeat of docked application server 170.

In some embodiments, application monitor 450 monitors a heartbeat of docked application server 170 by sending a SIP-compliant OPTIONS request to docked application server 170. In the depicted implementation, application monitor 450 may act as an originating SIP user agent and establish a connection 452 with docked application server 170. Because SIP mandates that the response to an OPTIONS request be the same response that would have been made had the request been a SIP Invite message, docked application server 170 returns a SIP 200 (OK) response to an OPTIONS message if docked application server 170 is operable and ready to accept a call, a SIP 486 (Busy Here) response when docked application server 170 is busy, and so forth. By interpreting the response from docked application server 170, ADM 301 employs an OPTIONS request/response technique to enable a heartbeat function for determining the basic state of docked application server 170.

The IMS message monitor 410 is operable to inform the anomaly handler 420 when an anomaly state for docked application server 170 is determined. Anomaly handler 420 as shown includes or has access to a database structure referred to as an anomaly handling rule set 422. An anomaly handling rule set 422, as suggested by its name, includes a set of one or more rules that define or otherwise influence the manner in which ADM 301 functionally isolates docked application server 170 from the network core, which includes the resources in session control layer 102, when docked application server 170 is not functioning properly. Specific examples of representative rules and rule sets are described in greater detail below, however, anomaly handler 420 may, using an IMS compliant network example, control or otherwise communicate with the Diameter message forwarder 440 and the SIP message forwarder 430 on behalf of a malfunctioning docked application server 170 to enable ADM 301 to isolate the docked application server 170 while simultaneously presenting an operational interface to the IMS core. Anomaly handler 420 may, for example, direct Diameter message forwarder 440 and SIP message forwarder 430 to block or re-direct messages that would otherwise be exchanged between docked application server 170 and session control functions 134 and/or subscriber servers 136. In some embodiments, Diameter message forwarder 440 and SIP message forwarder 430 may forward messages in a "flow through" manner when docked application server 170 is in a normal operational state. In these embodiments, messages exchanged between docked application server 170 and session control functions 134 and/or subscriber server 136 would flow through the message forwarders 430 or 440 when docked application server 170 is in normal operational state. In these embodiments, IMS message monitor 410 may monitor message activity using reports from message forwarders 430 and/or 440. Message forwarders 430 and/or 440 could then change their "flow-through" behaviors based on instructions from anomaly handler 420 when docked application server 170 is determined to be exhibiting abnormal messaging activity. For example, anomaly handler 420 may configure message forwarders 430 and/or 440 to block, re-direct, or return messages as described herein when docked application server 170 is exhibiting abnormal messaging activity.

Referring now to FIG. 5A through 5E, an exemplary set of anomaly handling rule sets 422-1 through 422-6 are depicted for various types of new applications servers 170 and various anomaly handling policies. Anomaly handling rule sets 422 implement anomaly handling policies of anomaly handler 420 and determine at least part of the behavior of ADM 301 when ADM 301 is acting as a functional buffer for docked application server 170. Each docked application server 170 may be implemented as any of at least four types of SIP entities, namely, an originating SIP user agent that initiates SIP requests, a terminating SIP user agent that receives SIP requests, as well as a SIP proxy server and a back-to-back SIP user agent, both of which transmit and generate application server messages. A docked application server's SIP entity type may influence the anomaly handling rules that are applicable to the application server. For example, the anomaly handling rules for a docked application server 170 that is an originating SIP user agent may only require a rule for handling outgoing messages, i.e., SIP requests initiated by docked application server 170. An incoming message rule is not needed for docked application server 170 that is an originating SIP user agent because this type of application server never receives SIP requests and will not be receiving any response messages when its own requests are being blocked or otherwise handled by ADM 301. The anomaly handling rules for a docked application server 170 that is a terminating SIP user agent, in contrast, may include a rule for handling SIP requests sent to such docked application server 170 as well as a rule for handling any response messages generated by such docked application server 170.

As depicted in FIG. 5A through FIG. 5F, anomaly handling rule sets 422 include various anomaly handling rule fields 501 through 505. In the depicted embodiment, the anomaly handling rule fields include an ADM ID field 501, an ADM URI field 502, a type field 503, an action field 504, and an alternate URI field 505. ADM ID field 501 identifies the applicable ADM 301 and URI field 502 indicates a network address for the applicable ADM 301. The type field 503 indicates the SIP entity type of the applicable application server in a standardized format. The action field 504 indicates the action that the applicable ADM 301 takes on behalf of an application server for messages generated by and/or transmitted to the application server as appropriate. The alternate URI field 505 indicates a URI of an application to which an ADM 301 may forward an application server message. Other embodiments may include more or fewer fields.

A rule set 422 may include an incoming rule, applicable to messages addressed to or otherwise intended for a docked application server 170, and an outgoing rule applicable to messages generated by a docked application server 170. In SIP compliant embodiments, incoming messages may include SIP requests generated by session control layer resources and addressed to or otherwise intended for a docked application server 170 as well as responses, from session control layer resources, to SIP requests generated by a docked application server 170. Conversely, outgoing messages in SIP compliant embodiments may include SIP requests generated by a docked application server 170 and responses generated by a docked application server 170 to SIP requests generated by session control layer resources.

In some embodiments, ADM 301 may be responsible for determining, not only when to invoke a rule set 422, but also which messages, if any, are exempt from the invoked rules. As an example, there may be one or more SIP transactions associated with a docked application server 170 that are pending or otherwise incomplete at the precise moment when an ADM 301 determines that the docked application server 170 is in an abnormal state. In some embodiments, ADM 301 may invoke the appropriate anomaly handling rules and apply the handling rules to new SIP transactions only. In these embodiments, ADM 301 may allow messages pertaining to transactions that were pending when the anomaly handling rules were invoked to flow through so that the applicable session control layer resource and the docked application server 170 can complete their SIP transactions respectively.

Figure 5A:
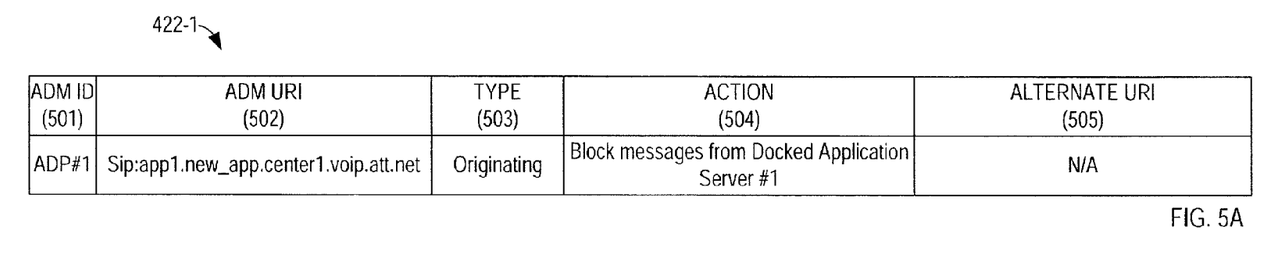

FIG. 5A illustrates an exemplary anomaly handling rule set 422-1 specifying how ADM 301 handles outgoing application server messages for a docked application server 170 that acts as an originating SIP user agent. In the depicted embodiment, anomaly handling rule set 422-1 includes an alphanumeric identifier for ADM 301 in the ADM ID field 501 and a URI for ADM 301 in URI field 502. Action field 504 as shown indicates that anomaly handling rule set 422-1, when invoked, causes applicable ADM 301 to block outgoing messages from the docked application server 170. In the case of an originating SIP user agent, the outgoing messages from docked application server 170 represent SIP requests generated by docked application server 170. Alternate URI field 505 is blank because an originating SIP user agent does not receive SIP requests. Similarly, anomaly handling rule set 422-1 does not require a rule for handling incoming messages because, when ADM 301 blocks SIP requests from docked application server 170, there should not be any SIP responses intended for docked application server 170.

Figure 5B:
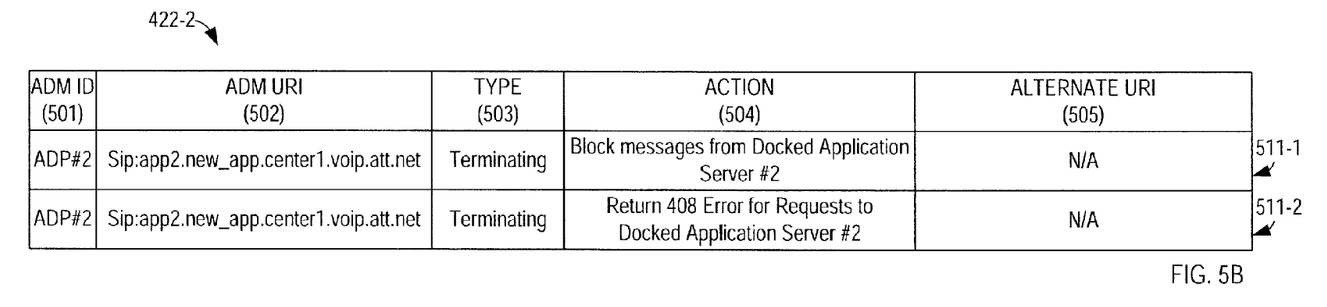

FIG. 5B illustrates an exemplary anomaly handling rule set 422-2 for a docked application server acting as a terminating SIP user agent. In the depicted implementation, anomaly handling rule set 422-2 includes an outgoing rule 511-1 applicable to outgoing application server messages and an incoming rule 511-2 applicable to incoming messages. In the case of a terminating SIP user agent, incoming rule 511-2 applies to SIP requests addressed to or otherwise intended for docked application server 170 and outgoing rule 511-1 applies to all messages from the docked application. In the depicted embodiment, incoming rule 511-2, when invoked in response to an anomaly state associated with a docked application server 170, causes ADM 301 to respond to incoming SIP requests addressed to or otherwise intended for docked application server 170, on behalf of docked application server 170 by returning a 408 Error message as indicated in action field 504 of rule 511-2. The outgoing rule 511-1 as illustrated causes ADM 301 to block outgoing SIP messages from the docked application server 170 as indicated in action field 504.

Figure 5C:
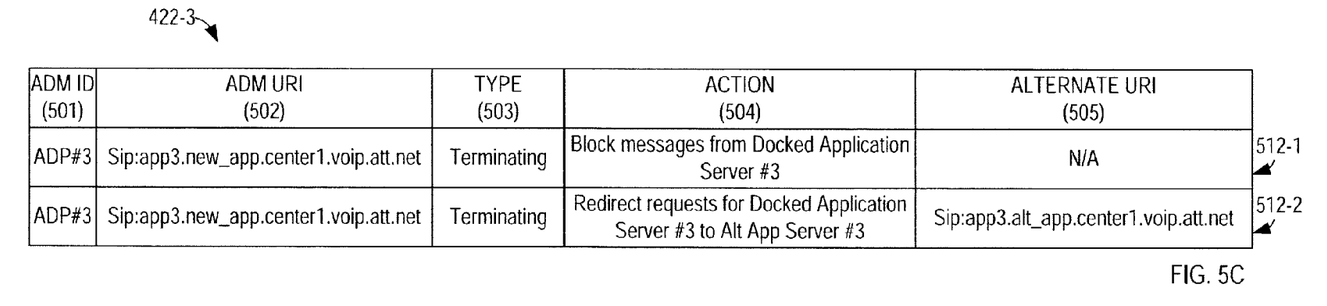

FIG. 5C illustrates another example of an anomaly handling rule set 422-3 for a docked application acting as a terminating SIP user agent. In the depicted embodiment, anomaly handling rule set 422-3 includes an incoming message rule 512-2 that causes ADM 301 to respond to SIP requests addressed to or otherwise intended for docked application server 170 on behalf of the applicable docked application server 170 by redirecting the SIP requests to an alternate URI indicated in alternate URI field 505. Anomaly handling rule set 422-3 also includes an outgoing message rule 512-1 that blocks outgoing messages from docked application server 170 as indicated in action field 504.

Figure 5D:
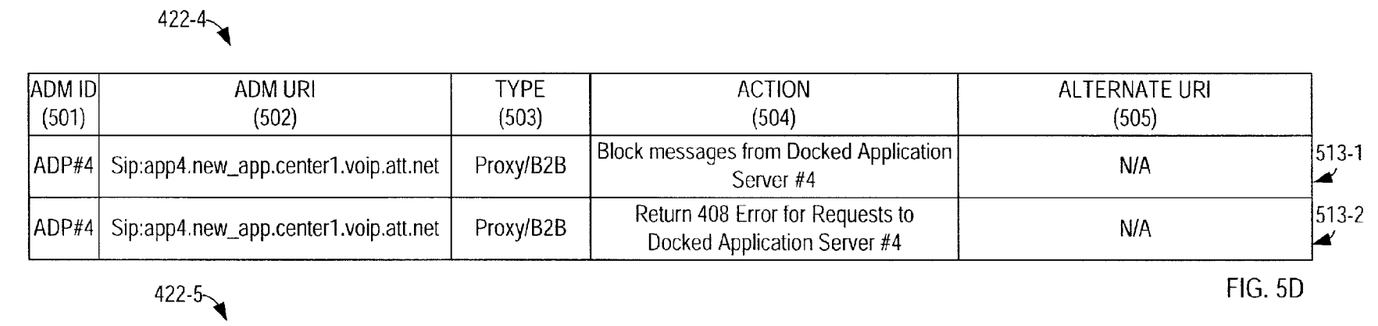

FIG. 5D illustrates an anomaly handling rule set 422-4 for a docked application server that acts as either a SIP proxy server or a SIP back-to-back user agent. In the depicted embodiment, anomaly handling rule set 422-4 includes an incoming message rule 513-2 that causes ADM 301 to respond to SIP requests addressed to or otherwise intended for docked application server 170 on behalf of docked application server 170 by returning a 408 Error response as indicated in action field 504. Anomaly handling rule set 422-4 as shown further includes an outgoing message rule 513-1 that blocks outgoing messages from docked application server 170 as indicated in action field 504.

Figure 5E:
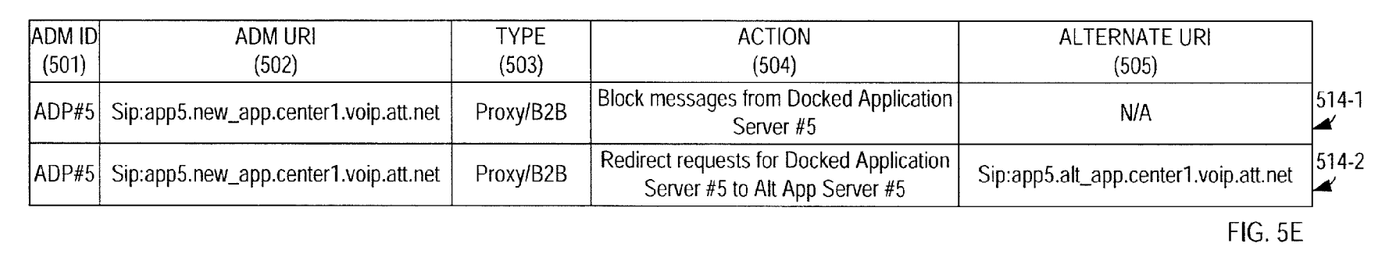

FIG. 5E illustrates an anomaly handling rule set 422-5, which is a second example of a rule set for a docked application server 170 that acts as a SIP proxy server or a SIP back-to-back user agent. In the depicted embodiment, anomaly handling rule set 422-5 includes an incoming rule 514-2 that causes ADM 301 to redirect SIP requests addressed to or otherwise intended for docked application server 170 to an alternate URI as indicated in action field 504 and alternate URI field 505. Anomaly handling rule set 422-5 also includes an outgoing message rule 514-1 that blocks outgoing messages from docked application server 170 as indicated in action field 504.

Figure 5F:
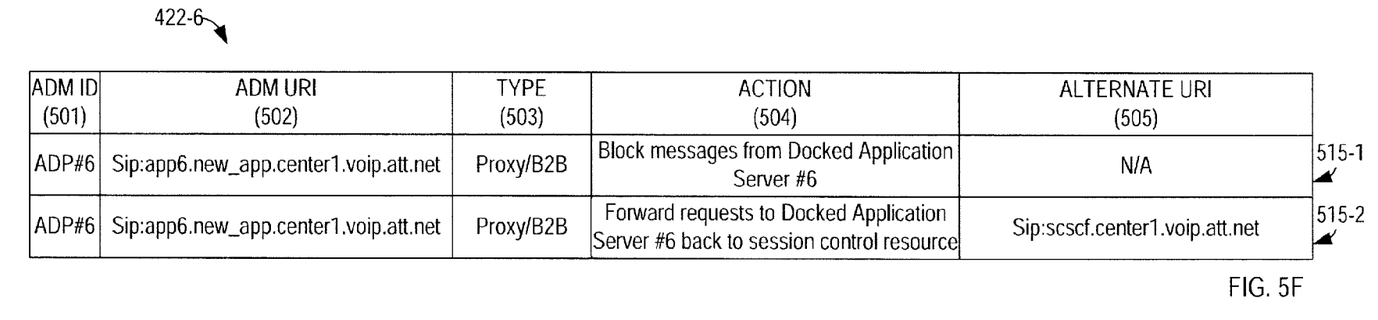

FIG. 5F illustrates an anomaly handling rule set 422-6, which is a third example of a rule set for a docked application server 170 that acts as a SIP proxy server or a SIP back-to-back user agent. In the depicted embodiment, anomaly handling rule set 422-6 includes an incoming message rule 515-2 that causes ADM 301 to forward SIP requests addressed to or otherwise intended for docked application 170 back to the message's sender, namely, the URI of an I-CSCF or S-CSCF at the URI as indicated in action field 504 and alternate URI field 505. Anomaly handling rule set 422-6 also includes an outgoing message rule 515-1 that blocks outgoing messages from docked application server 170 as indicated in action field 504.

In the examples above, the ability to redirect incoming application server messages to an alternate application server is beneficial, for example, when a docked application server 170 is implementing an enhancement to a service or feature for which an existing application server is installed and functional. In these situations, redirecting an application server message may include redirecting an application server message to the existing application server to provide the existing service or feature without the enhancement. The ability to return an incoming application server message to a session control function is beneficial when, as an example, it is used to avoid a failed application server from harming call session setup or control. If, for example, a new application server is intended to provide music-based ringback tones, returning application server messages addressed to the failed application server effectively bypasses the new application server, which is acceptable where the call can be set up with plain old ringback tones. The rule sets presented here are illustrative, but are not exhaustive of all possible rule sets. Depending upon the implementation, rule sets can be mapped to various data structures or data schema according to the used database or file system.

Figure 6:
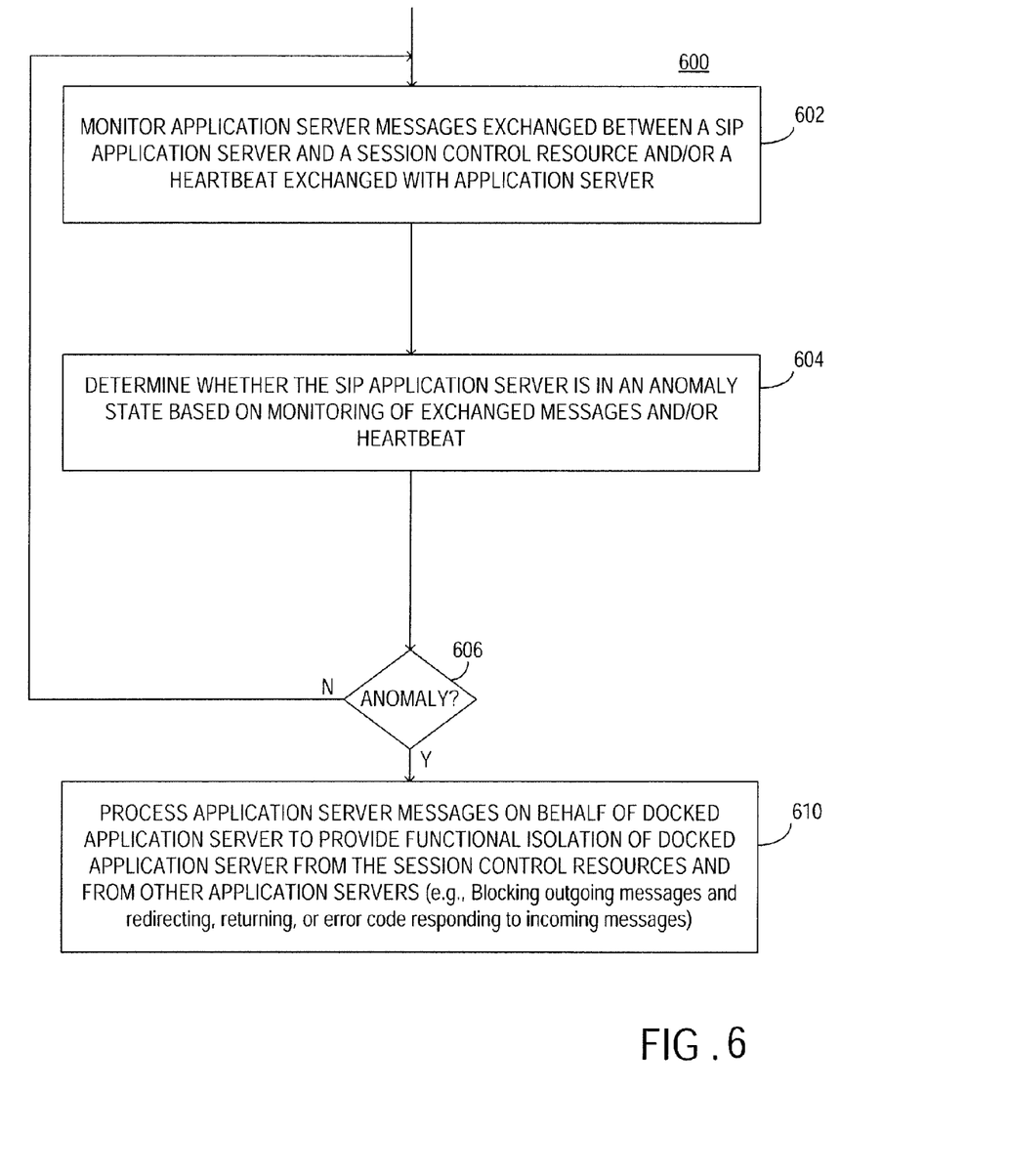
FIG. 6 is a flow diagram of an embodiment of a method of operation of the application docking module of FIG. 4.

The exemplary set of anomaly handling rule sets 422 depicted in FIG. 5A through FIG. 5F correspond to specific anomaly handling actions that an application docking station 150 may take in a given implementation. FIG. 6 depicts a flow chart of selected elements of a method 600 of operation for an exemplary ADM 301. The depicted embodiment of method 600 includes a monitoring block 602 that includes monitoring of application server messages exchanged between a docked application server 170 and session control layer resources such as session control functions 134 or subscriber servers 136 depicted in FIG. 1 and/or monitoring a heartbeat exchanged with docked application server 170 that indicates the health of the docked application server.) Method 600 as shown further includes determining (block 604), from the monitoring of the application server messages and/or the heartbeat, if docked application server 170 is in an anomaly state. Method 600 further includes processing (block 610) application server messages on behalf of docked application server 170 to functionally isolate docked application server 170 from the session control layer resources and from other application servers 160 if ADM 301 determines (block 606) that docked application server 170 is in an anomaly state.

Figure 7:
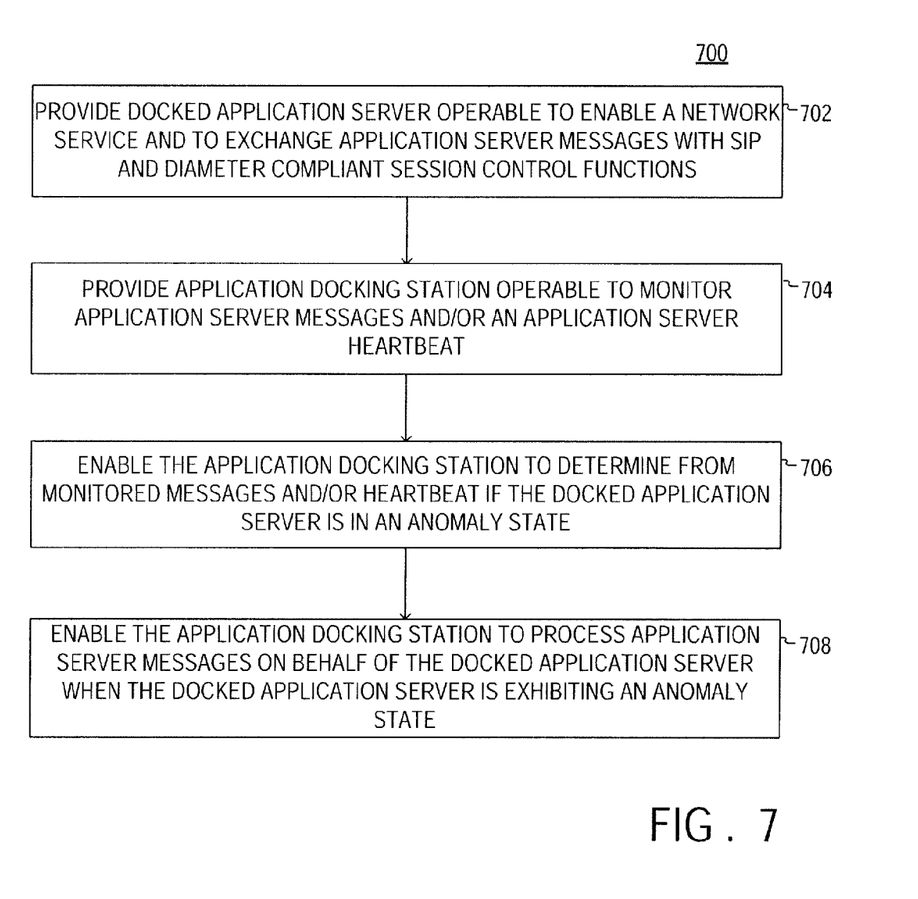
FIG. 7 is a flow diagram of selected elements of an embodiment of an application docking service that facilitates deploying an application server in a communication network.

In some embodiments, the disclosed application docking functionality may be implemented as a service for safeguarding a production environment from a new application server to facilitate rapid deployment of a new feature or service supported by the new application server. Turning to FIG. 7, a flow diagram depicts selected elements of one embodiment of a rapid deployment facilitation service 700. In the depicted embodiment, service 700 includes an optional block 702 in which a new application server is provided. The new application server is operable to exchange application server messages with various IMS network resources. Exchanging application server messages with the IMS network resources may include, as examples, exchanging SIP compliant application server messages with IMS compliant CSCFs and/or exchanging Diameter compliant application server messages with IMS compliant HSSs. Block 702 is an optional element of service 700 at least in part because, in some embodiments (not depicted), a new application server may be developed, created, installed, maintained, licensed from, and/or otherwise provided by a third party. In these embodiments, the provider of application docking station 150 may not be the same as the third party provider.

Method 700 as depicted in FIG. 7 further includes providing (block 704) an application docking station operable to monitor application server messages and, particularly, application server messages exchanged between a new application server and session control layer resources such as subscriber servers and session control functions. The monitoring done by the application docking station may be entirely passive monitoring as long as the new application server is exhibiting expected or otherwise functional or normal operation. Messages from the new application server are delivered to their intended destinations and messages sent to the new application server from session control layer resources are delivered to and received by the new application server. The application docking station may further be operable to monitor a heartbeat of the new application server.

Method 700 as depicted further includes enabling (block 706) the application docking station to determine from its monitoring of the application server messages and the heartbeat whether the new application server is operating in or otherwise exhibiting an anomaly state. As discussed above, an anomaly state may refer to any state of the docked application server that produces unanticipated messaging activity, unexpected changes in messaging activity, non-responsiveness, or the like. Unexpected messaging activity may encompass the frequency or volume of messaging activity, the content or type of messaging activity, or other suitable measures of messaging activity. Unexpected messaging activity may be determined when certain anomaly criteria are satisfied. The anomaly criteria may include a message burst criteria that is satisfied when a message rate associated with a new application server exceeds a threshold, an error response criteria that is satisfied when an error response rate associated with a new application server exceeds an error response threshold, and a timeout criteria satisfied when a rate of message timeouts exceeds a timeout threshold. Unexpected messaging activity may be determined based on a comparison between SIP message counts or SIP message rates and Diameter message counts or Diameter message rates such that, for example, an anomaly state is flagged when the Diameter message rate greatly exceeds the SIP message rate or vice versa. Unexpected messaging activity may also be determined based on a comparison between historical message counts or rates and current message counts or rates. Historical message counts may be maintained for each ADM 301 by application docking station 150.

An anomaly state may be triggered or indicated by activity or conditions that are not directly determined by monitoring the messaging activity of the new application server. In some embodiments, a heartbeat as an example, may be employed to indicate an anomaly condition, An application monitor in ADM 301 may address a heartbeat message in the form of a SIP OPTIONS message to the docked application server. If a response to the heartbeat message is not received in a reasonable time frame, on the order of a few seconds in some embodiments, an anomaly state may be indicated. Still other embodiments may include implementations of the application docking station that determine anomaly states based at least in part on other parameters including, as examples, parameters related to latency and/or other performance measures of the new application server.

The depicted embodiment of method 700 further includes taking action to functionally isolate the new application server from the network including the other application servers and the network core including the network's session control layer resources. In the depicted embodiment, method 700 includes enabling (block 708) the application docking station to process application server messages on behalf of the new application server when the new application server exhibits or is determined to be in an anomaly state so that messages to and from the new application server are prevented from reaching their intended destinations. Instead, compliant responses to incoming requests are generated on behalf of the new application server so that the requesting resources may continue to operate. Similarly, any requests and responses generated by the new application server may be blocked or otherwise prevented from reaching their intended destinations. As discussed above, an application docking station may generate responses on behalf of the new application server by redirecting requests to other application servers, returning requests to a session control function such as an S-CSCF, or responding with a SIP error code message.

Figure 8:
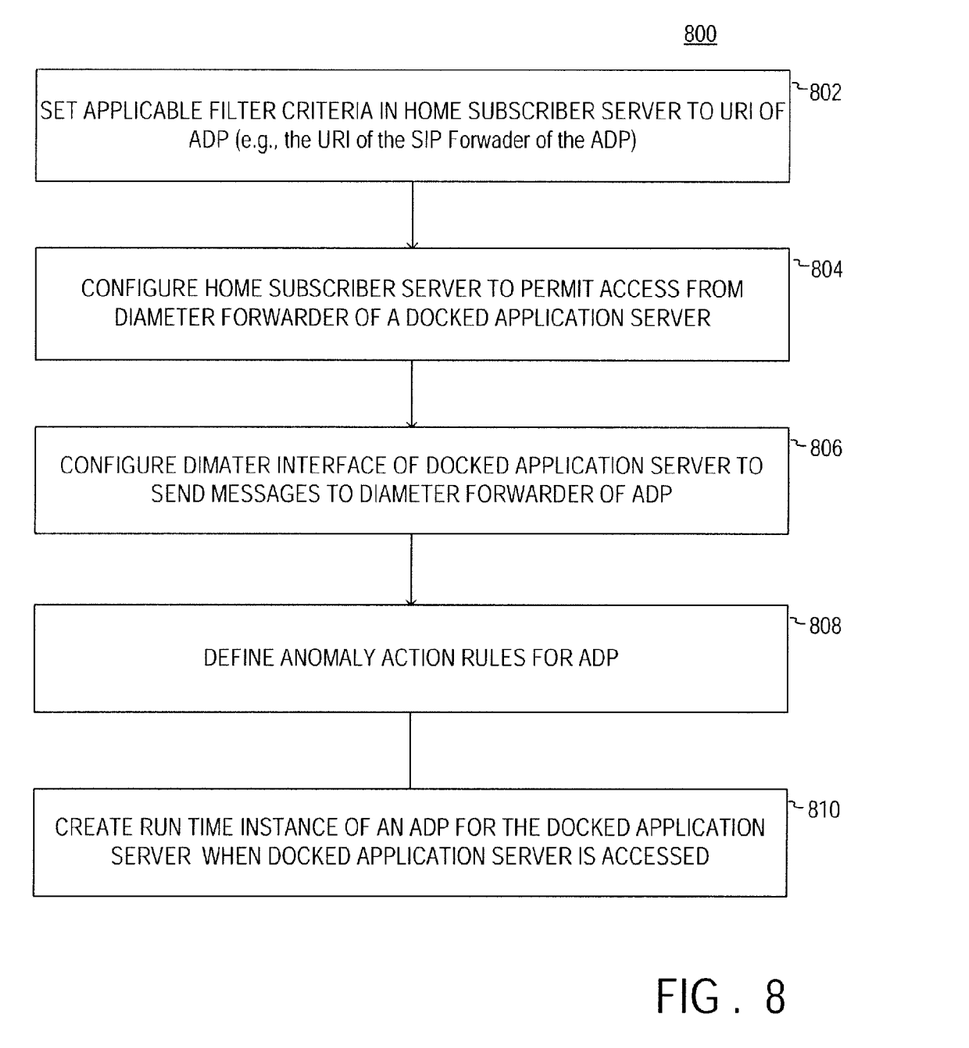
FIG. 8 is a flow diagram illustrating selected additional detail of an embodiment of an element in the method of FIG. 7.

Turning now to FIG. 8, a flow diagram depicts selected elements of one embodiment of a method 800 of implementing an application docking station as described herein. The depicted embodiment of method 800 employs an IMS compliant network. In the depicted embodiment, method 800 includes setting (block 802) a destination field of an IMS filter criteria in an HSS to indicate the URI of an application docking station for all subscribers subscribed to the service provided by the docked application server. In some embodiments, block 802 includes, more specifically, setting a destination URI of the filter criteria to the URI of an ADM 301 associated with the applicable new application server. The home subscriber server may then be modified in its configuration (block 804) to permit access from an element of the application docking station. This may include permitting access from a Diameter message forwarder of applicable ADM 301. The depicted embodiment of method 800 further includes configuring (block 806) a Diameter interface of the new application server to transmit messages to the Diameter forwarder of ADM 301. In addition to configuring the various URIs and other network elements, method 800 as shown includes defining (block 808) anomaly action rules for applicable ADM 301 and creating (block 810) a run time instance of ADM 301 when the new application server is to be initiated.

The above disclosed subject matter is to be considered illustrative, and not restrictive, and the appended claims are intended to cover all modifications, enhancements, and other embodiments that fall within the true spirit and scope of the disclosed subject matter. Thus, to the maximum extent allowed by law, the scope of the claimed subject matter is to be determined by the broadest permissible construction of the claims terms and their equivalents, and shall not be restricted or limited by what is expressly disclosed in the foregoing detailed description.

What is claimed is:

1. An application docking station suitable for use in a communication network, comprising:
   a processor; and
   memory storing instructions that when executed cause the processor to perform operations, the operations comprising:
   monitoring application server messages exchanged between an application server and a session control layer of a communications network;
   determining an anomaly in the application server from one of the application server messages;

activating an anomaly handler in response to the anomaly in the application server;
isolating the application server from the session control layer in response to the anomaly;
processing the one of the application server messages by the anomaly handler on behalf of the application server in response to the anomaly;
determining, by the anomaly handler, a type of the one of the application server messages;
selecting a first message handler, of a plurality of message handlers, in response to the one of the application server messages requiring a call session control function;
selecting a second message handler, of the plurality of message handlers, in response to the one of the application server messages being exchanged between the application server and a home subscriber server;
passing the one of the application server messages from the anomaly handler to the first message handler for processing in response to requiring the call session control function; and
passing the one of the application server messages from the anomaly handler to the second message handler for processing in response to exchange between the application server and a home subscriber server;
responsive to detecting an unexpected heartbeat status of the application server:
blocking outbound application server messages, generated by the application server and intended for the session control layer; and
processing, by the anomaly handler on behalf of the application server, inbound application server messages addressed to the application server.

2. The application docking station of claim 1, wherein the operations further comprise comparing a count of sessions initiation protocol messages to an historical count.

3. A method of deploying a service associated with an application server in a communication network, comprising:
monitoring application server messages exchanged between an application server and a session control layer of a communications network;
determining an anomaly in the application server from one of the application server messages;
activating an anomaly handler in response to the anomaly in the application server;
isolating the application server from the session control layer in response to the anomaly;
processing the one of the application server messages by the anomaly handler on behalf of the application server in response to the anomaly;
determining, by the anomaly handler, a type of the one of the application server messages;
selecting a first message handler, of a plurality of message handlers, in response to the one of the application server messages requiring a call session control function;
selecting a second message handler, of the plurality of message handlers, in response to the one of the application server messages being exchanged between the application server and a home subscriber server;
passing the one of the application server messages from the anomaly handler to the first message handler for processing in response to requiring the call session control function; and
passing the one of the application server messages from the anomaly handler to the second message handler for processing in response to exchange between the application server and a home subscriber server;
detecting an unexpected heartbeat status of the application server;
blocking outbound application server messages, generated by the application server and intended for the session control layer; and
processing, by the anomaly handler on behalf of the application server, inbound application server messages addressed to the application server.

4. The method of claim 3, further comprising retrieving policy rules of an anomaly handling policy.

5. The method of claim 4, further comprising returning an error code.

6. The method of claim 3, further comprising:
setting a forwarding destination of a filter criteria object associated with the application server to reflect a universal resource indicator of the application docking station;
configuring the home subscriber server to permit access to a subscriber profile object by the application server;
configuring a Diameter message forwarder of the application server to forward the application server messages; and
defining anomaly handling rules for the application server messages.

7. The method of claim 6, further comprising creating a runtime instance of the application docking station when the application server is initiated.

8. A memory storing program instructions, that when executed by a processor, cause the processor to perform operations, the operations:
monitoring application server messages exchanged between an application server and a session control layer of a communications network;
comparing a current message rate with an historical message rate;
determining a disparity between the current message rate and the historical message rate;
ending a dormant heartbeat function in response to an absence of message activity between the application server and the session control layer;
determining an anomaly in the application server from the disparity and the heartbeat function;
activating an anomaly handler in response to the anomaly in the application server;
isolating the application server from the session control layer in response to the anomaly;
processing the application server messages by the anomaly handler on behalf of the application server in response to the anomaly;
determining, by the anomaly handler, a type of one of the application server messages;
selecting a first message handler, of a plurality of message handlers, in response to the one of the application server messages requiring a call session control function;
selecting a second message handler, of the plurality of message handlers, in response to the one of the application server messages being exchanged between the application server and a home subscriber server;
passing the one of the application server messages from the anomaly handler to the first message handler for processing in response to requiring the call session control function; and
passing the one of the application server messages from the anomaly handler to the second message handler for processing in response to exchange between the application server and a home subscriber server blocking outbound application server messages, generated by the application server and intended for the session control layer; and processing, by the anomaly handler on behalf of the application server, inbound application server messages addressed to the application server.

9. The memory according to claim 8, wherein the operations further comprise retrieving.

10. The memory according to claim 8, wherein the operations further comprise determining the current message rate.

11. The memory according to claim 8, wherein the operations further comprise determining a Diameter message count.

* * * * *